Nov. 26, 1968

L. F. BENDER 3,412,758

FLUID CONVEYING APPARATUS HAVING TWO-PIECE SLIDE VALVE

Original Filed June 17, 1965

INVENTOR.
LLOYD F. BENDER

BY
James E. Nilles
ATTORNEY

Nov. 26, 1968  L. F. BENDER  3,412,758
FLUID CONVEYING APPARATUS HAVING TWO-PIECE SLIDE VALVE
Original Filed June 17, 1965  2 Sheets-Sheet 2

VAC.

INVENTOR.
LLOYD F. BENDER
BY
James E. Miller
ATTORNEY

United States Patent Office 3,412,758
Patented Nov. 26, 1968

3,412,758
FLUID CONVEYING APPARATUS HAVING TWO-PIECE SLIDE VALVE
Lloyd F. Bender, Hayward, Wis. 54843
Original application June 17, 1965, Ser. No. 464,628, now Patent No. 3,273,514, dated Sept. 20, 1966. Divided and this application May 23, 1966, Ser. No. 552,275
2 Claims. (Cl. 137—625.65)

ABSTRACT OF THE DISCLOSURE

Fluid conveying apparatus having a fluid vessel for alternately accumulating and releasing fluid, including a solenoid operated, two pieces slide valve which can be shifted smoothly and positively without binding or leakage thereof.

---

This invention relates generally to dairy equipment or the like, that is, fluid handling equipment for conveying fluid, such as milk or orange juice, and which can be cleaned-in-place. More specifically, the invention relates to an improved slide valve for such equipment and which alternately admits vacuum and atmosphere to the equipment.

This is a divisional application of my co-pending U.S. application Ser. No. 464,628 filed June 17, 1965, entitled "Fluid Conveying Apparatus," issued on Sept. 20, 1966 as U.S. Patent No. 3,273,514.

This invention is in the nature of an improvement over the valve shown in my U.S. Patent No. 3,191,576 issued June 29, 1965, and entitled, "Milk Line Releaser and Washer Apparatus."

An object of the present invention is to provide an improved two piece slide valve for equipment of the above type, which valve insures smooth operation and a good sliding seal at all times.

Other objects and adavntages of the present invention will appear as this disclosure progresses, reference being had to the accompanying drawings, in which:

FIGURE 4 is a wiring diagram of the electric timer and solenoids which operate the slide valve mechanism.

Figure 1:
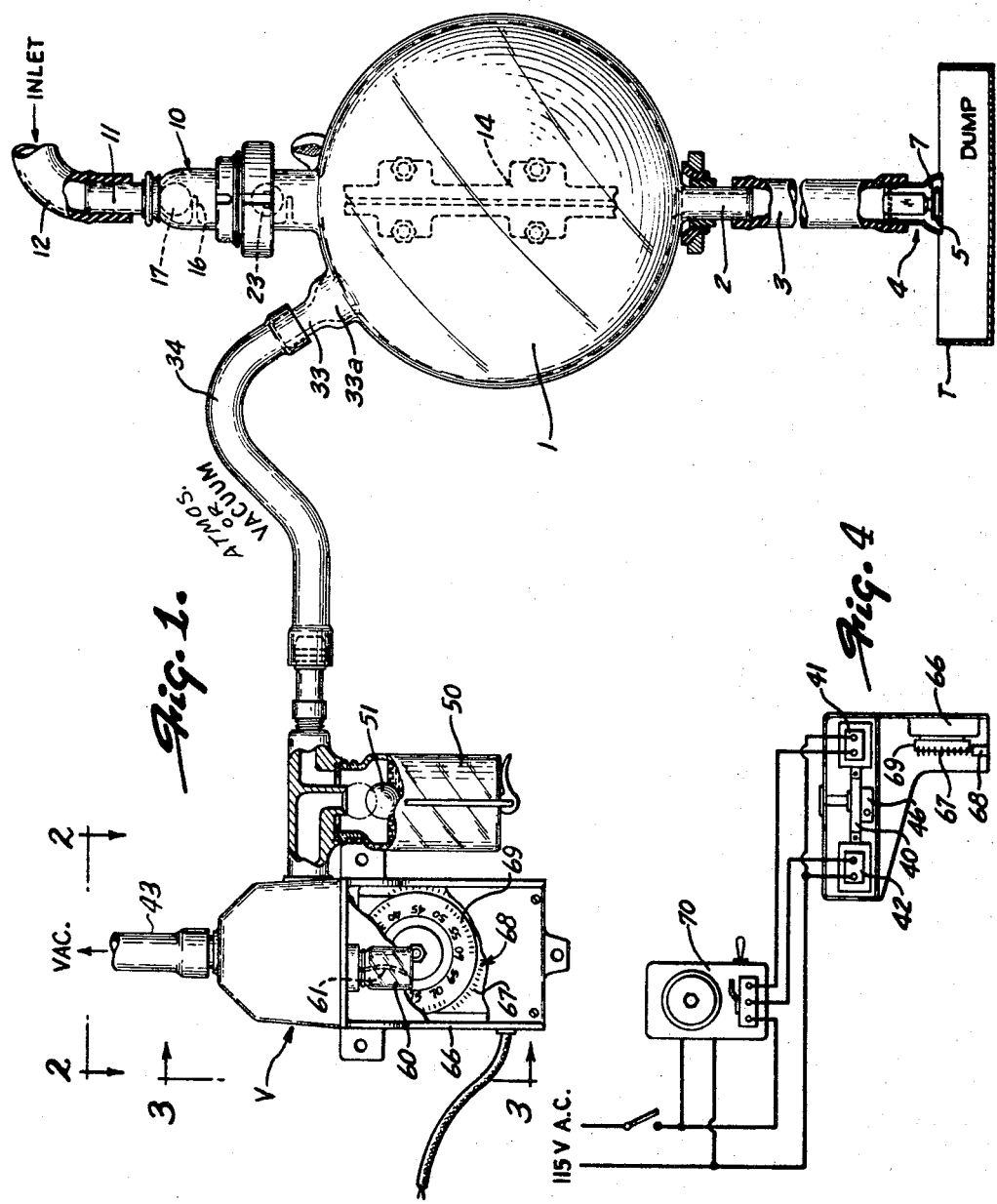
FIGURE 1 is an elevational view of fluid conveying apparatus of the type used with the present invention, certain parts being shown as broken away and in section for clarity.

Referring in greater detail to the drawings, the fluid vessel 1 is spherical in shape and is made of transparent material such as glass which contributes to insuring cleanliness. The vessel has an integrally formed fluid discharge conduit 2 at its lower end to which is attached a flexible conduit 3 of any desired length. Conduit 3 has a one-way valve 4 at its lower end which closes when the vessel is subjected to vacuum, the O-ring 5 of the shiftable valve element 6 sealing against the inner surface of the flared end member 7. Valve 4 opens to permit fluid in the vessel to dump by gravity when the vessel is subjected to atmosphere.

A fluid inlet conduit 10 is located at the upper side of the vessel and is made separable to permit assembly of the parts and facilitate cleaning, inspection and repair. The uppermost end 11 of the conduit is of reduced diameter, and receives the fluid supply conduit 12. Fluid is thus delivered to the vessel from any source, such as a conventional milk line in a barn or a tank of fluid.

A suitable bracket 14 secures the vessel in a conventional manner and at any desired height to a building member (not shown), and the vessel rests on the lower end of the bracket and is held as taught in my U.S. Patent 3,186,428 which issued on June 1, 1965.

The inlet conduit 10 has an integrally formed projection or pin 16 extending into its upper end on which a one-way check ball 17 rests. Another ball 23 acts as a distributor as taught in said parent application.

A conduit nipple 33 is formed integrally in the top of the vessel and extends at an incline therefrom. An enlarged portion 33a prevents fluid from being sucked into the attached vacuum conduit 34 as taught in my co-pending U.S. application Ser. No. 443,055, filed Mar. 26, 1965 and entitled "Milk Line Equipment" which issued on Mar. 21, 1967, as Patent No. 3,310,061, and reference may be had to that patent if a more complete explanation of the position and shape of the vacuum inlet is thought to be either necessary or desirable.

Figures 2, 3:
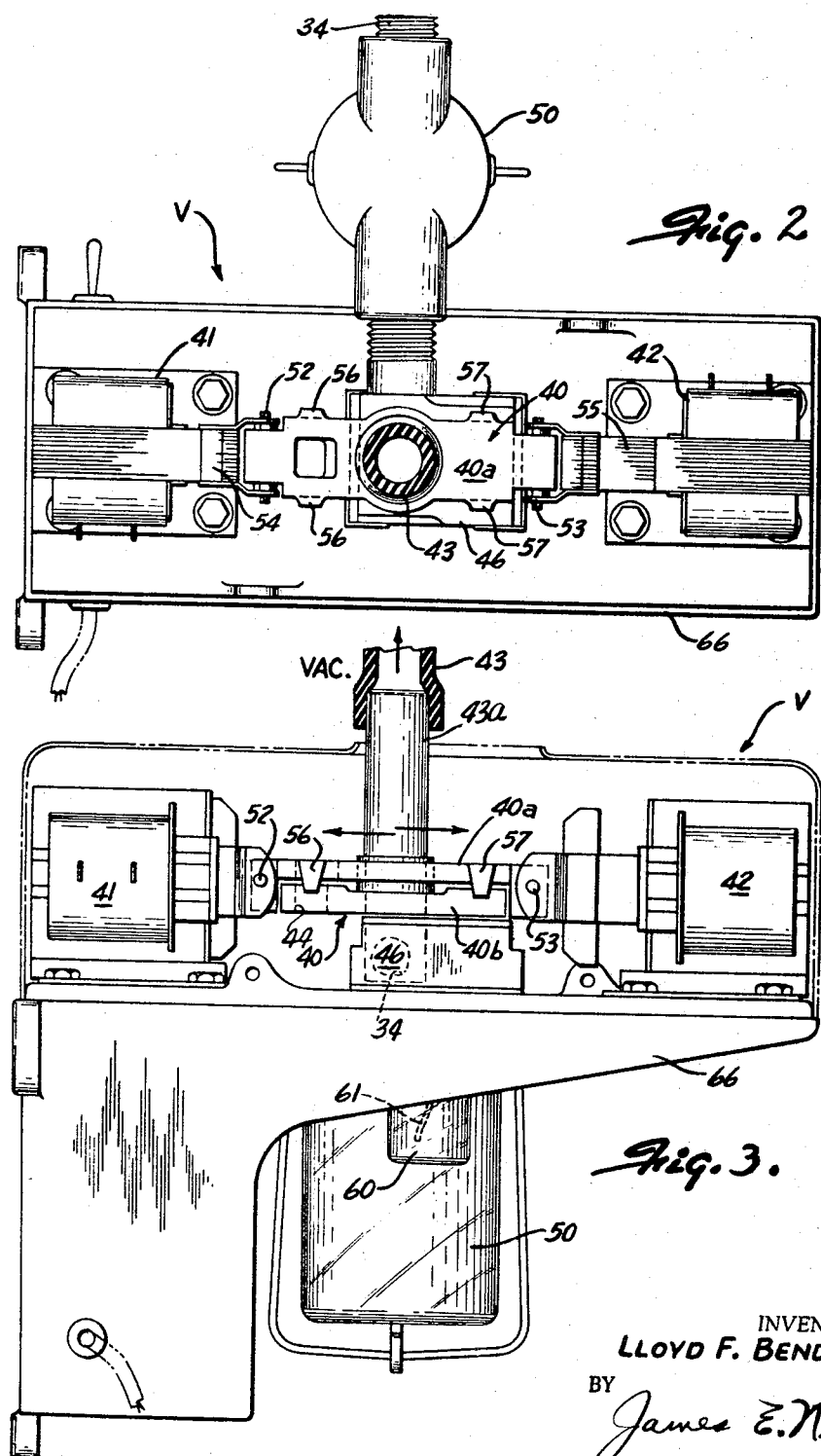
FIGURE 2 is a plan view of the valve mechanism shown in FIGURE 1, the view being taken generally from the line 2—2 in FIGURE 1 but on an enlarged scale.
FIGURE 3 is an elevational view of the valve mechanism taken along line 3—3 in FIGURE 1 but on an enlarged scale.

Means are provided for alternately subjecting the vessel to vacuum to thereby draw fluid through inlet conduit 12 to fill the vessel, and then subjecting the vessel to atmospheric pressure to cause the fluid to dump via conduit 3 into the tank T. This means includes a slide valve V, which has a shiftable slide 40 that is connected to and actuated by solenoids 41 and 42. The slide 40 is connected to the vacuum conduit 43 by a nipple 43a fixed thereto, and the line 43 shifts with the slide 40. Vacuum conduit 43 is connected with a source of vacuum pressure (not shown) and when it and the slide 40 have been slipped by solenoid 41 and are in one position (as shown in FIGURES 2 and 3), vacuum is applied to the vessel. When solenoid 42 shifts the slide to the other position, the hole 44 in the slide registers with the conduit 34 via valve block 46 and thus opens the vessel to atmosphere.

A moisture trap 50 having a check ball 51 is interposed in conduit line 34 between vessel 1 and the valve V. Conduit 34 is a vacuum-atmosphere conduit as it alternately places the vessel 1 in communication with the atmosphere or vacuum, via valve V.

The slide 40 is made of two parts 40a and 40b which generally slide together as a unit and insure that a good seal is provided between the slide 40 and block 46.

Part 40a is secured at each end by pins 52 and 53 to the plungers 54 and 55 of the respective solenoids. Part 40a also has guide arms 56, 57 along its sides which embrace or straddle part 40b to maintain lateral alignment between these two parts of the slide.

Vacuum conduit 43 is secured directly to part 40b via nipple 43a and can move slightly towards and away from part 40a. This permits part 40b to bear tightly against the block 46 when the vacuum is being applied to the vessel. Otherwise the ivot connections of the slide to the solenoid plunger may prevent this tight abutting relationship of the slide and block 46.

A lubricating bottle 60 having a wick 61 maintains the slide lubricated and silent in operation.

The action of the solenoids is timed by an electric timer 66 which can be set to operate the solenoids in any desired time intervals. This timer may be of the one minute replater type which has a series of adjustable tabs 67, each representing one second, which tabs can be manually set so as to clear or abut against a microswitch 68 as the timer wheel 69 rotates. The timer includes an electric motor 70 which drives the wheel in the known manner.

In operation, the timer is set to provide the desired interval of time during which the vessel is subjected to vacuum. During this time the dump valve 4 is closed and fluid is drawn from the conduit 12 into the vessel, and ball 17 sets on pin 16 and permits fluid to flow downwardly past it.

When the vessel is substantially full, the timer then causes a solenoid 42 to shift the valve slide 40 to align hole 44 with the conduit 34, thus placing the vessel under atmospheric pressure. This immediately permits valve 4 to open and dump fluid. At the same time ball 17 rises and immediately closes off conduit 12.

*Resume*

By means of the present invention, a two-piece slide valve has been provided for fluid conveying apparatus, in which one part of the valve is in tight sliding and sealing engagement with the valve block; this part of the slide has the vacuum conduit connected directly to it so that the part slides in tight engagement with the block and no leakage of vacuum can occur. The other part of the slide valve is connected directly to the solenoid means and both parts of the slide valve slide together in slightly loose relationship. For the purpose of maintaining the two slide parts in workable yet loose relationship, the guide arms at the sides of the slides are provided and which cause one part to embrace or straddle the other and thus maintain lateral alignment between the two valve slide parts. In this manner, that part of the side to which the vacuum conduit is attached bears tightly against the valve block, yet it can move free and smoothly to alternately connect the passage in the valve block with the vacuum line or the hole to atmosphere; the other part of the slide valve can move slightly toward or away from the valve block, thus preventing binding with the pivot points of the solenoid plunger.

Various modes of carrying out the invention are contemplated as being within the scope of the following claims particularly pointing out and distinctly claiming the subject matter which is regarded as the invention:

1. In combination with fluid conveying apparatus having a fluid vessel and a conduit extending therefrom, valve mechanism comprising, a valve block having a fluid passage therein; a shiftable slide having two elongated parts generally coextensive in length and arranged in parallelism and overlying relationship with one another, one part of which is in sliding and sealing engagement with one end of said passage; said conduit connected to the other end of said passage, said one part having a vacuum conduit connected directly thereto and also having an opening therein which is spaced from said vacuum conduit so that said vacuum conduit and opening can alternately be aligned with said passage by shifting said slide, solenoid means connected to the other part of said slide for shifting both parts of said slide together, and guide means along the length of one of the parts and embracingly straddling the other part to maintain lateral alignment between the parts to thereby hold said parts together in slightly loose relationship to permit said one part to bear tightly against said valve block.

2. Fluid conveying apparatus, comprising, a vessel having a fluid inlet conduit at its upper end, a fluid outlet conduit at its lower end and a vacuum-atmosphere conduit adjacent its upper end; and shiftable valve means for alternately placing said vacuum-atmosphere conduit, and consequently said vessel, in communication with a source of vacuum and with the atmosphere; said valve means comprising a valve block having a fluid passage therein; a shiftable slide having two elongated parts generally coextensive in length and arranged in parallelism and overlying relationship with one another, one part of which is in sliding and sealing engagement with one end of said passage; said vacuum-atmosphere conduit connected to the other end of said passage, said one part having a vacuum conduit connected directly thereto and also having an opening therein which is spaced from said vacuum conduit so that said vacuum conduit and opening can alternately be aligned with said passage by shifting said slide, solenoid means connected to the other part of said slide for shifting both parts of said slide together, and guide means along the length of one of the parts and embracingly straddling the other part to maintain lateral alignment between the parts to thereby hold said parts together in slightly loose relationship to permit said one part to bear tightly against said valve block.

References Cited

UNITED STATES PATENTS

| | | | |
|---|---|---|---|
| 1,562,770 | 11/1925 | Jamieson | 119—14.07 |
| 3,099,280 | 7/1963 | Holzbock | 137—625.65 XR |
| 3,132,669 | 5/1964 | Feldsted | 137—347 XR |
| 3,149,641 | 9/1964 | Norton | 137—625.65 |
| 3,191,576 | 6/1965 | Bender | 119—14.07 |

M. CARY NELSON, *Primary Examiner.*

ROBERT J. MILLER, *Assistant Examiner.*